United States Patent
Zuerblis et al.

[15] 3,659,048
[45] Apr. 25, 1972

[54] DIGITAL FREQUENCY CHANGE CONTROL SYSTEM

[72] Inventors: Joseph R. Zuerblis, Parsippany; Gyorgy I. Vancsa, Newark, both of N.J.

[73] Assignee: Westinghouse Electric Corporation, Pittsburgh, Pa.

[22] Filed: Apr. 30, 1970

[21] Appl. No.: 33,428

[52] U.S. Cl. ..............................178/66 A, 307/227, 325/30, 325/163, 328/27, 328/186, 331/179
[51] Int. Cl. ..........................................................H04l 27/12
[58] Field of Search ...................178/66 R, 67, 66 A; 325/30, 325/38 B, 163; 332/9, 11; 328/14, 187, 186, 27; 331/38, 179; 321/5; 307/227

[56] References Cited

UNITED STATES PATENTS

| | | | |
|---|---|---|---|
| 3,190,958 | 6/1965 | Bullwinkle | 178/66 |
| 3,491,282 | 1/1970 | Heinrich | 321/5 |

*Primary Examiner*—Robert L. Griffin
*Assistant Examiner*—Kenneth W. Weinstein
*Attorney*—A. T. Stratton, C. L. Freedman and John L. Stoughton

[57] ABSTRACT

A fast-operating frequency-shift-controlled system for transmitting information in which a simulated sine wave is generated digitally and in which the frequency of the generated wave is shifted without discontinuities and thereby transmits data at an increased speed.

10 Claims, 10 Drawing Figures

INVENTORS
Joseph R. Zuerblis
Gyorgy I. Vancsa

John L. Stoughton
ATTORNEY

DIGITAL FREQUENCY CHANGE CONTROL SYSTEM

This invention is an improvement over the invention shown and described in a copending application of Gyorgy I. Vancsa, Ser. No. 33,429, filed Apr. 30, 1970 and assigned to the same assignee as is this invention.

BACKGROUND OF THE INVENTION

To assure efficient transmission of coded messages over presently available transmission mediums, it is necessary to transform the data to a shape that matches the characteristics of the transmission medium. Present techniques use sine wave carriers. The carriers are modulated by information to be transmitted. There are three major types of modulation used. Amplitude modulation, phase modulation, and frequency modulation. All of these modulation techniques manipulate a sine wave which is basically an analog quantity. Generally, such sine waves are generated by tuned circuits and the modulating information is transmitted by changing the carrier amplitude, phase or frequency.

If only a half duplex communication channel is available, it is necessary to turn the carrier on and off. In order to make the most use of the communication channel, the turn-around time should be reduced to the minimum. If transients are introduced at the points when the carrier is turned on or off "ringing" occurs. This "ringing" should be reduced as much as possible since the transients so introduced may provide undesired information.

DESCRIPTION OF PREFERRED EMBODIMENT

Figure 1:
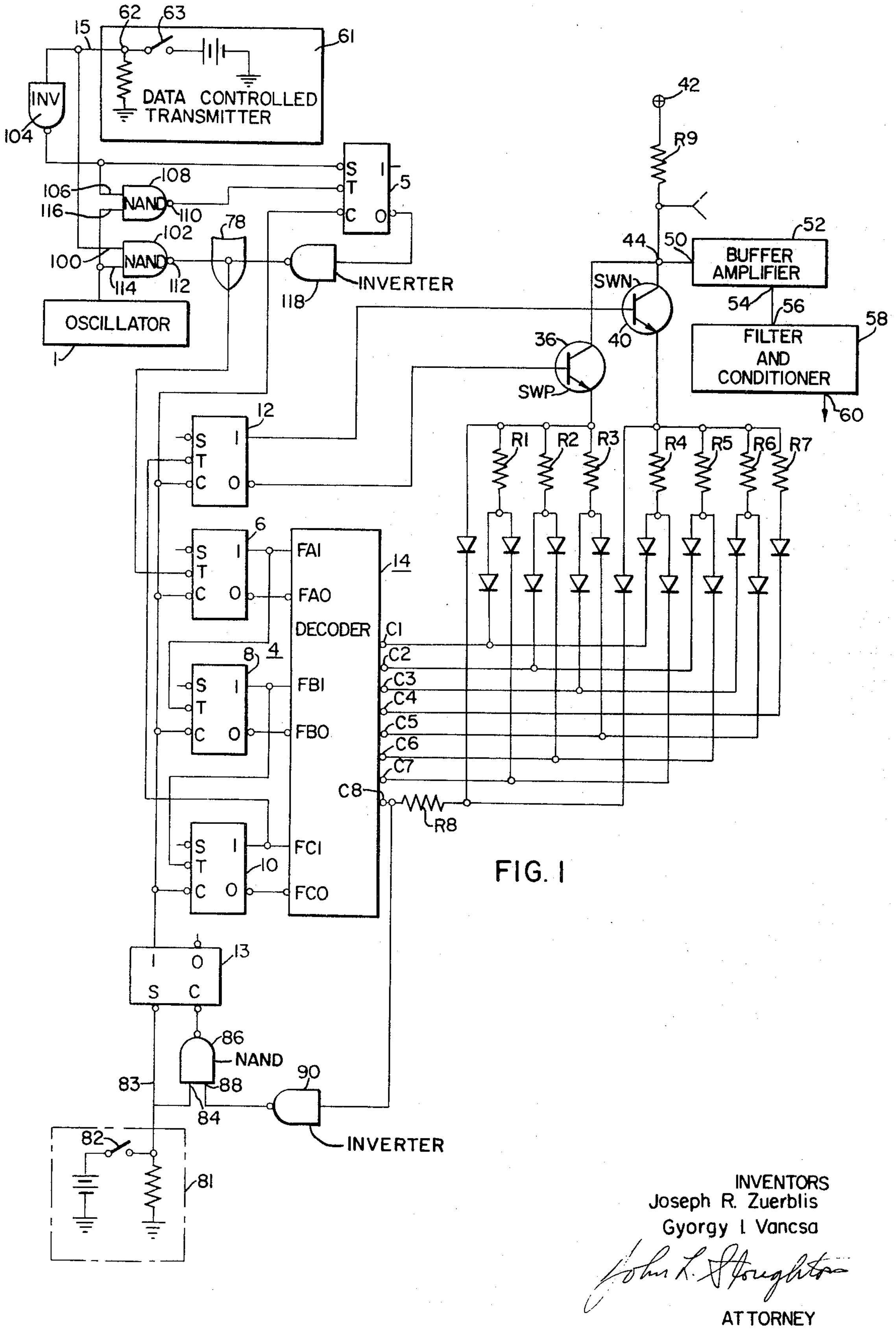
FIG. 1 is a block diagram showing a transmitting system embodying the invention.

Referring to the drawings by characters of the reference, the digital frequency shift control system comprises an oscillator 1 for providing operating pulses at a predetermined constant frequency. The oscillator 1 is connected to supply its operating pulses to a countdown mechanism 4 which, as illustrated, comprises a plurality of flip-flops 5, 6, 8 and 10. The output connections of the flip-flops 6, 8 and 10 are connected to the input connections of a decoder 14 having output terminals C1, C2, C4, C5, C6, C7 and C8.

The output of the oscillator 1 is, during standby, prevented from driving the flip-flops 5–10 by a blocking signal supplied to their terminals C from a flip-flop 13. Upon removal of the blocking signal the oscillator drives the flip-flop 6 directly at the full frequency of the oscillator 1 or through the flip-flop 5 which effectively halves the frequency at which the flip-flop 6 is driven.

The rate at which the oscillator 1 drives the flip-flop 6 of the countdown mechanism 4 is determined by the condition of the switch 63 of the data-controlled transmitter 61. The bus 15 connects the transmitter 61 to one input terminal 100 of a NAND device 102 and through an inverter 104 to one input terminal 106 of a NAND device 108. As will be explained in greater detail below, the NAND devices 102 and 108 will maintain a positive potential at their output terminal when a negative or ground potential is applied to at least one of its input terminals. Therefore the NAND device 108 is prevented from establishing a ground potential at its output terminal 110 when bus 15 is positive and NAND device 102 is prevented from establishing a ground potential at its output terminal 112 when bus 15 is negative.

The oscillator 1 is connected to the input terminals 114 and 116 of the devices 102 and 108. The terminal 112 is connected to the input terminal T of the flip-flop 6 and will supply a negative going pulse to the flip-flop 6 at each positive going pulse of the oscillator 1 when the switch 63 is closed to establish a positive potential on the bus 15. Similarly the output terminal 110 is connected to the input terminal T of the flip-flop 5 and will supply a negative going pulse to flip-flop 5 at each positive going pulse of the oscillator 1 when the switch 63 is open and the bus 15 is at negative or ground potential.

The output terminal 0 of the flip-flop 5 is connected through an inverter 118 to the terminal T of the flip-flop 6. The symbol 78 designates symbolically the fact that a negative going pulse may be transmitted to the terminal T of the flip-flop 6 from the output terminal 112 of the NAND device 102 when the output terminal of the inverter 118 is positive or may be transmitted to the terminal T of the flip-flop 6 from the terminal 0 of the flip-flop 5 when the output terminal 112 of the NAND device 102 is at a positive potential. As will become apparent as the description continues, the negative going pulses are supplied by the flip-flop 5 at half the frequency of the oscillator 1 and effectively halves the frequency at which the flip-flop 6 is driven.

The output terminal 1 of flip-flop 6 is connected to the terminal T of flip-flop 8, the terminal 1 of flip-flop 8 to the terminal T of the flip-flop 10, and the terminal 1 of the flip-flop 10 to the terminal T of the flip-flop 12 whereby the frequency at which the driven flip-flop reverses the output potential of its output terminals 1 and 0 is half the rate at which the driving flip-flop alternates the output potential between its output terminals.

The output terminal 0 of a polarity controlling flip-flop 12 is connected to the base of a positive half cycle controlling transistor 36 and the output terminal 1 is connected to the base of a negative half cycle controlling transistor 40. As will be explained below, at one condition of the flip-flop 12 the output terminal 0 thereof will be positive and cause base drive current to cause the positive half cycle controlling transistor 36 to conduct and permit the energization of the circuits through the resistors R1, R2, R3 and R8 and the associated diodes as determined by the decoder 14. When the output terminal 1 of the flip-flop 12 is at positive potential, base drive current flows to cause the negative half cycle controlling transistor 40 to conduct and permit the energization of the circuit through the resistors R4, R5, R6, R7 and R8.

With the positive half cycle transistor 36 conducting current will flow from the positive input terminal 42 through the resistor R9, the transistor 36 and the one of the resistors R1, R2, R3 or R8 as determined by the decoder 14. The relative magnitudes of the resistors R8 and R9 are so determined that when current flows from the positive input terminal 42 through the resistor R9, transistor 36, resistor R8 and terminal C8 of decoder 14, the potential at the output terminal 44 will assume an initial potential which forms the zero line 46 of the digitally produced output sine wave 48 illustrated in FIG. 2. The output terminal 44 is connected to the input terminal 50 of a buffer or amplifier network 52, the output terminal 54 of which is connected to the input terminal 56 of a filter and conditioner network 58. The output terminal 60 of the network 58 is connectable to a transmission circuit (not shown) for transmitting the output signal to a receiving station (not shown).

The decoder 14 has three pairs of input terminals FA1–FA0; FB1–FB0; and FC1–FC0 connected to the pairs of output terminals 1 and 0 of the flip-flops 6, 8 and 10, respectively. When the oscillator 1 drives the countdown mechanism 4, the terminals C1–C8 are sequentially connected to ground and thereby control the circuit through which current flows from the input terminal 42.

Assuming a half cycle in which transistor 36 is conductive, the decoder progressively connects the terminals C8, C1, C2, C3, C4, C5, C6, C7 and C8 to ground and current flows sequentially through the circuits which include the resistors R8, R1, R2, R3. The magnitudes of the resistors R1, R2 and R3 are proportioned to provide the voltage magnitude of the steps which occur during the time periods $t_2$–$t_3$, $t_3$–$t_4$ and $t_4$–$t_5$ and the companion magnitudes of the steps of the periods $t_6$–$t_7$, $t_7$–$t_8$ and $t_8$–$t_9$. It will be noted that there is no connection through transistor 36 to the C4 terminal so that during the time interval $t_5$–$t_6$ during which period the maximum peak voltage of the sine wave occurs, the voltage at terminal 44 is substantially the maximum voltage applied to the positive input terminal 42.

The magnitudes of the resistances of the resistors R4, R5 and R6 are related to the magnitude of the resistance of the resistor R9 similarly to the relation of resistors R1, R2 and R3 to the resistor R9 except in the opposite manner to provide the voltage levels of the curve 48 during the time intervals $t_{10}$–$t_{11}$, $t_{11}$–$t_{12}$, $t_{12}$–$t_{13}$, $t_{14}$–$t_{15}$, $t_{15}$–$t_{16}$ and $t_{16}$–$t_{17}$. In the case of the negative half cycle, a circuit is provided to the output terminal C4 through the resistor R7. The magnitude of the resistance of this resistor R7 is proportioned to the magnitude of the resistance of the resistor R9 to provide the voltage step of the period $t_{13}$–$t_{14}$ which corresponds to the step of the period $t_5$–$t_6$ of the positive half cycle.

The magnitude of the voltage during the steps $t_2$–$t_3$ . . . $t_{16}$–$t_{17}$ follows the sine law with the change in magnitude between the steps being equal to the cosine of the angle of the step produced simulated sine wave which is half way between the angle at which the step actually occurs. The basic concept of proving a simulated sine wave by steps which change the output magnitude in accordance with the cosine law is not new to me, it having been taught by Heinrich and Kernick in their U.S. Pat. application Ser. No. 117,966 filed June 19, 1961 and assigned to the same assignee as is this application, now U.S. Pat. No. 3,491,282 dated Jan. 20, 1970.

Figure 2:
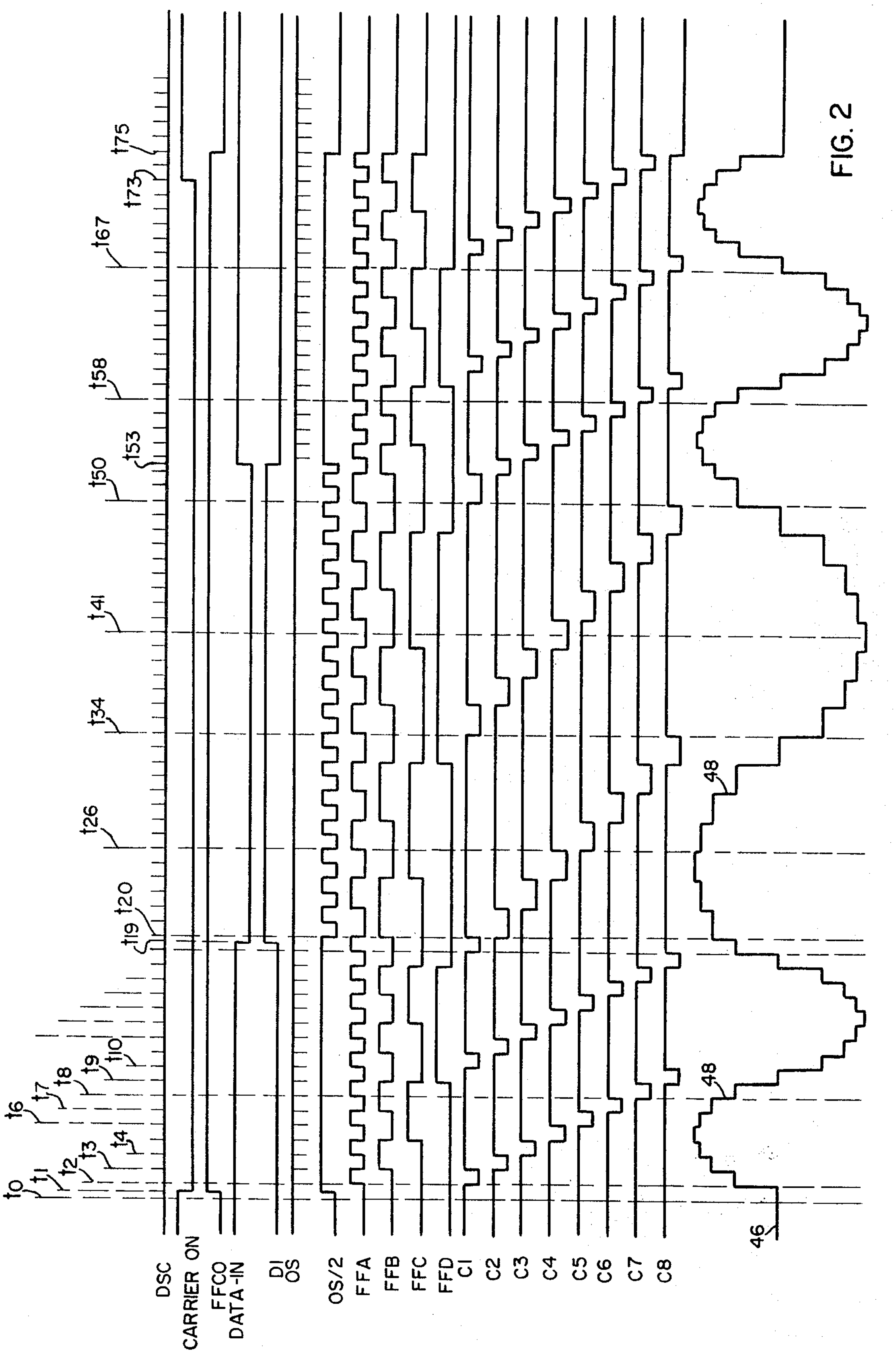
FIG. 2, shows curves which illustrate certain operating features of the invention.

The frequency or wave length of the wave 48 is controlled in accordance with the potential of the data input terminal 62 as determined by the data-controlled transmitter 61. Any suitable data transmitter which provides two voltage potentials at the input terminal 62 may be utilized. Diagrammatically, this data-controlled transmitter 61 is provided with a switch 63 which when in its open-circuit position permits the terminal 62 to remain at ground potential but which in its closed position will raise the potential of terminal 62 to a predetermined positive potential with respect to ground. As indicated in FIG. 2, following a change in potential of the terminal 62 from a positive potential to ground potential as shown by the curves "Data In," the frequency of the wave 48 will reduce to one half as the result of the reversal of the position of the switch 63.

The period during which the oscillator 1 is permitted to actuate the countdown mechanism 4 is controlled by the "carrier-on" control 81. This control can take any of numerous forms and is shown, abbreviatedly, as embodying a switch 82 which when closed establishes a positive potential on the bus 83. With the switch 82 open, the bus 83 will be at negative or ground potential. The bus 83 is connected to the terminal S of the flip-flop 13 and to the terminal 84 of the NAND device 86. The input terminal 88 of the device 86 is connected to output terminal of an inverter 90 and the output terminal of the device 86 is connected to terminal C of the flip-flop 13. The output terminal 1 of the flip-flop 13 is connected to the terminal C of each of the flip-flops 5, 6, 8, 10 and 12. When terminal 1 is energized with a negative or ground potential, the resulting negative potential on the C terminals of the flip-flops 5, 6, 8, 10 and 12 prevents their being flipped and establishes them in their normal or reset positions with their 1 terminals negative and their 0 terminals positive. The control 81 is normally maintained with its switch 82 closed whereby the bus 83, the terminal S of the flip-flop 13, and the terminal 84 of the device 86 are all positive. During standby the terminal C8 is at ground potential. This terminal C8 is connected to the second input terminal 88 of the device 86 through an inverter 90 so that the terminal 88 will be positive. Under these conditions, the terminal S, of flip-flop 13 will be positive and the terminal C and 1 will be at ground.

Figure 3:
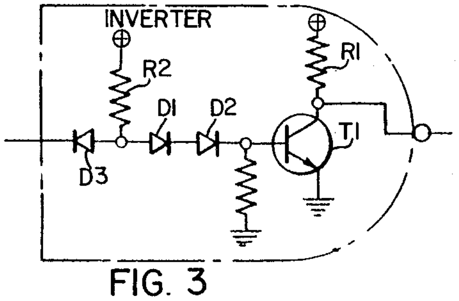
FIGS. 3–10 illustrate schematic circuitry which may be used in the blocks shown in FIG. 1.

While the FIGS. 3 through 11 each indicate schematic diagrams for the blocks set forth in FIG. 1, other suitable equivalent circuitry may be used. FIG. 3 shows a suitable schematic circuit for the inverters 90, 104 and 118. The circuit includes a transistor T1 having its emitter grounded and its collector connected to an output terminal and connected through a resistor R1 to a source of positive potential. The base of the transistor is connected through a pair of diodes D1, D2 and a resistor R2 to a positive source of potential. The common connection between the resistor R2 and the diode D1 is connected to the anode of a diode D3, the cathode of which is connected to the input terminal of the inverter. If the input terminal of the inverter is maintained at ground potential, current will flow from the positive source through resistor R2 and the diode D3 so that no base current will flow through the series connected diodes D1 and D2 to the transistor T1. Under this condition, the output terminal of the inverter will be maintained substantially at the positive potential of the source connected to the resistor R1. If a positive blocking potential is applied to the cathode of the diode D3, base current will flow from the resistor R2 through the diodes D1 and D2 and the base of the transistor T1. This renders the transistor T1 conducting to connect its output terminal to ground and reduce the output potential of the inverter to substantially ground potential.

Figure 4:
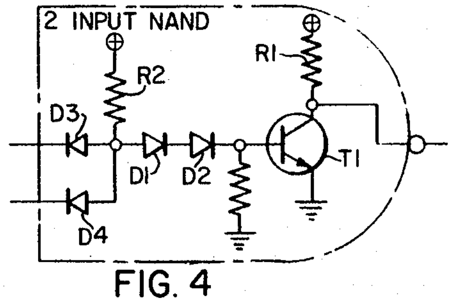

FIG. 4 illustrates a two input NAND device which may be used for the NAND devices 86, 102 and 108. It will be appreciated that the NAND device is substantially identical to the inverter except that it includes a second input terminal connected through and a diode D4 to the common connections of the resistor R2 and the diode D1. As long as one of the input terminals of the NAND device is maintained at ground potential base current will be shunted from the transistor T1 and the output terminal thereof will be maintained at a positive potential. It will also be appreciated that when the outputs of the inverter 118 and of the NAND device 102 are connected to a common bus as indicated in FIG. 1, that the rendering of the transistor T1 of either device 102 or 118 will maintain the potential of the common connection thereby at ground potential. This arrangement is indicated by the symbol 78.

Figure 6:
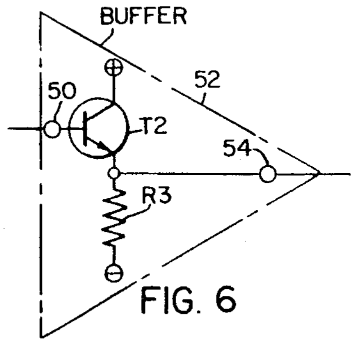

The buffer 52 is a high input impedance device and as shown in FIG. 6 includes a transistor T2 having its collector connected to a positive source of potential and its emitter connected to the output terminal 54 and to ground through a resistor R3. The base of the transistor T2 is connected directly to the input terminal 50. When a positive base drive potential is supplied to the input terminal 50, the transistor T2 conduct in accordance with the magnitude of the base current and a variable current flows form the positive source of potential to ground through the emitter collector circuit of the transistor T2 and resistor R3. This provides a variable potential across the resistor R3 and between the output terminal 54 and ground to provide an output signal which follows the potential fluctuations of the signal applied to the input terminals 50. As indicated above, this output terminal 54 is connected to the input terminal 56 of the filter and conditioner 58.

Figure 5:
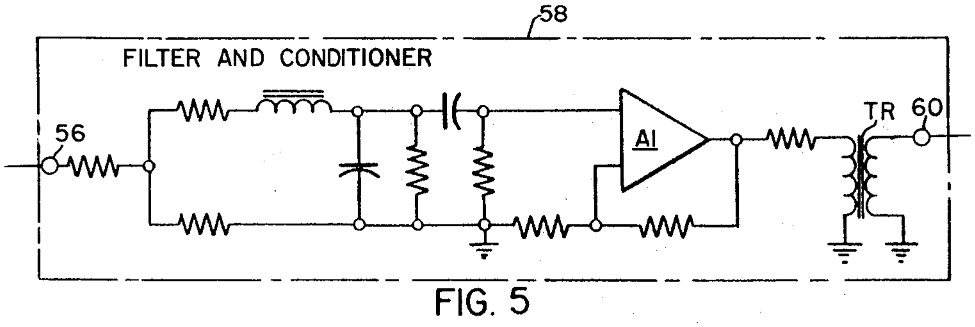

The schematic circuit of a typical filter and conditioner is shown in FIG. 5 and includes an operational amplifier A1 having its input terminal connected through suitable filtering circuitry to the input terminal 56 and its output terminal connected to energize the primary winding of a transformer TR. The secondary winding of the transformer TR is connected between the output terminal 60 and ground and when energized with a wave similar to wave 48 provides a filtered sine wave of which may be transmitted through any suitable transmission network as for example a telephone wire (not shown) to a receiving apparatus (not shown) which is sensitive to the phase of the sine wave supplied thereto.

Figure 7:
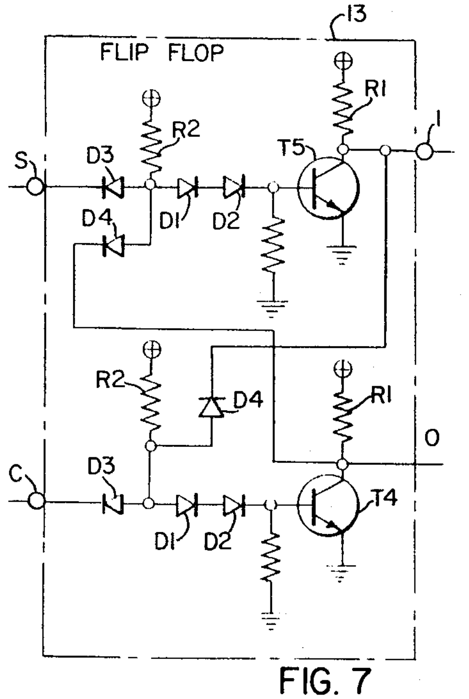

FIG. 7 shows schematically a circuit which may be used for the flip-flop 13. This circuit includes transistors T4 and T5 having their collectors connected to output terminals 0 and 1 and to sources of positive potential through resistors R1. The bases are connected through diodes D1 and D2 and resistors R2 to sources of positive potential and through diodes D1, D2 and D3 to the input terminals C and S. It will be apparent that the flip-flop 13 is essentially a pair of interconnected NAND devices of the type illustrated in FIG. 4 in which the input terminal including the diode D4 is connected to the output terminal of the other NAND device thereof. With the flip-flop 13 placed in a first condition, the transistor T4 thereof will be conducting to maintain the output terminal 0 at substantially ground potential and the transistor T5 will be non-conducting whereby the output terminal 1 thereof will be maintained at positive potential. Under these conditions, it will be appreciated that as long as a positive potential is at the input terminal C the base current will continue to flow to the transistor T4 and the output terminal 0 will be maintained at ground potential irrespective of any change in potential of the input terminal S. When however the potential applied to the input terminal C is lowered to ground potential, base current will be shunted to ground from the transistor T4 which transistor will thereupon be rendered blocked to raise the potential of the output terminal 0 to a positive potential. When this occurs, a positive potential is supplied to block the formerly conducting diode D4 which had been shunting base current from the transistor T5 to maintain that transistor blocked. If when this occurs, the potential at the input terminal S is positive, the transistor T5 will thereupon conduct and lower the potential of the output terminal 1 to substantially that of ground. Thereafter the potential of the input terminal C may be changed between positive and ground potential without further effect on the flip-flop. If however, the potential of the input terminal S is subsequently lowered to ground potential, the flip-flop 13 will flip into a condition into which the transistor T5 becomes blocked and if at the same time the potential applied to the input terminal C is positive, the transistor T4 will conduct to again place the output terminal 0 at ground potential.

Figure 8:
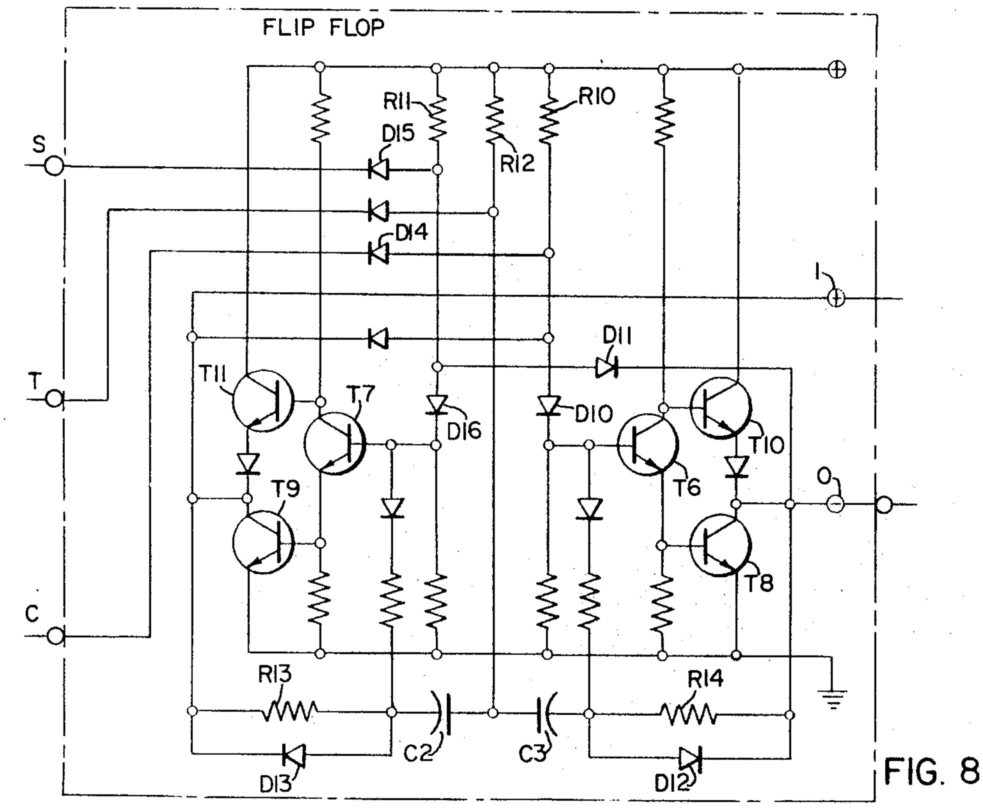

FIG. 8 illustrates schematically a suitable network for the flip-flops 5, 6, 8, 10 and 12 which are provided with output terminals 1 and 0 and input terminals S, T and C. The flip-flop of FIG. 8 includes a plurality of transistors T6, T7, T8, T9, T10 and T11. When the potential of the input terminal C is rendered ground or negative, providing that terminal S is positive, base current flows from the positive bus thereof through the resistor R10, diode D14, to the ground bus. Since there is no base current to transistor T6 it becomes non-conducting, and the base current to transistor T10 renders the output 0 positive. Since diodes D11 and D15 are both reverse biased, current will flow from the positive terminal through resistor R11 and diode D16 into the base of transistor T7. Transistor T7 turns on and supplies base current to transistor T9, turning it on thus terminal 1 now is on ground potential. This is the initial or reset condition of flip-flops 6, 8, 10 and 12 of FIG. 1. The flip-flop will remain in this operating condition even though the ground potential applied to the input terminal C is subsequently removed.

During the interval in which base current flows through the transistor T7 through the diode D16, it also flows through the diode D13 and resistor R12 to the common terminal of the capacitors C2 and C3. During this interval the terminal of the capacitor C2 is maintained at substantially ground potential by reason of its connection through the diode D13 to the grounded collector emitter circuit of the transistor T9. The terminal of the capacitor C3 away from the capacitor C2 is similarly connected through a diode D12 to the collector of the transistor T8, and through a resistor R14. As explained above, the potential of the collector of the transistor T8 is substantially that of the positive bus and therefore the terminal of the capacitor C3 connected through the resistor R14 thereto is maintained positive, the same potential as the C3 terminal which is connected to the capacitor C2.

If now a negative potential is applied to the input terminal T, the common connection between the capacitors C2 and C3 will be lowered to substantially that of ground potential. Since the capacitor C2 was charged with the terminal thereof connected to the capacitor C3 positive with respect to its other terminal, the lowering of the input terminal T to ground potential will cause charging current to flow to the capacitor C2 thereby terminating the base current flow to the transistor T7. This terminates emitter-collector conduction in the transistor T7 and the base current to the transistor T9. When this happens a transistor T11 conducts and the collector of the transistor T9 is connected through the emitter collector circuit of the transistor T11 to the positive bus and the potential of the output terminal 1 is rendered positive. When this occurs base current flows to the transistors T6 and T8 which thereupon conduct to shunt out of the base current to the transistor T10 thereby reducing the potential of the output terminal 0 to ground potential. A subsequent change in the potential of the input terminal T to a positive potential has no effect upon the flip-flop. When however, this potential of the input terminal T is subsequently lowered to ground potential the now charged capacitor C3 will cause the transistors T6 and T8 to become non-conducting and the conduction of the transistor T10 and thereafter the rendering of the transistors T7 and T9 conductive blocks the transistor T6 to flip the flip-flop into its originally described state.

Figure 9:
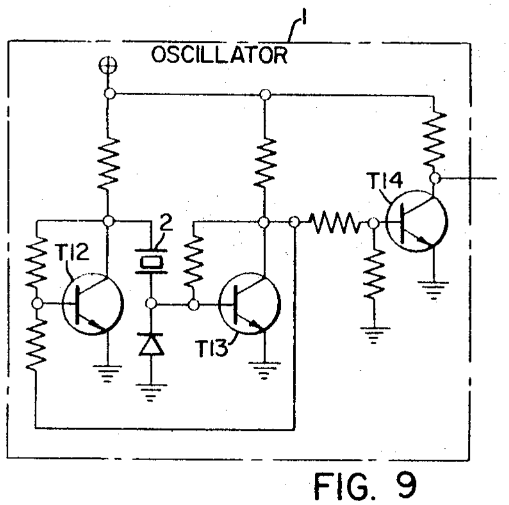

The oscillator 1 may take any suitable form as is shown in FIG. 9 which comprises a plurality of transistors T12, T13 and T14. The transistors T12 and T13 are arranged to oscillate in accordance with the oscillating frequency of the crystal 2 are connected by means of the amplifying transistor T14 to provide positive output pulses at the output terminal, which as described above, is connected to the input terminals 114 and 116 of the NAND devices 102 and 108. The negative going pulses are used to flip the flip-flop 5 or flip-flop 6, depending upon the condition of switch 63.

Figure 10:
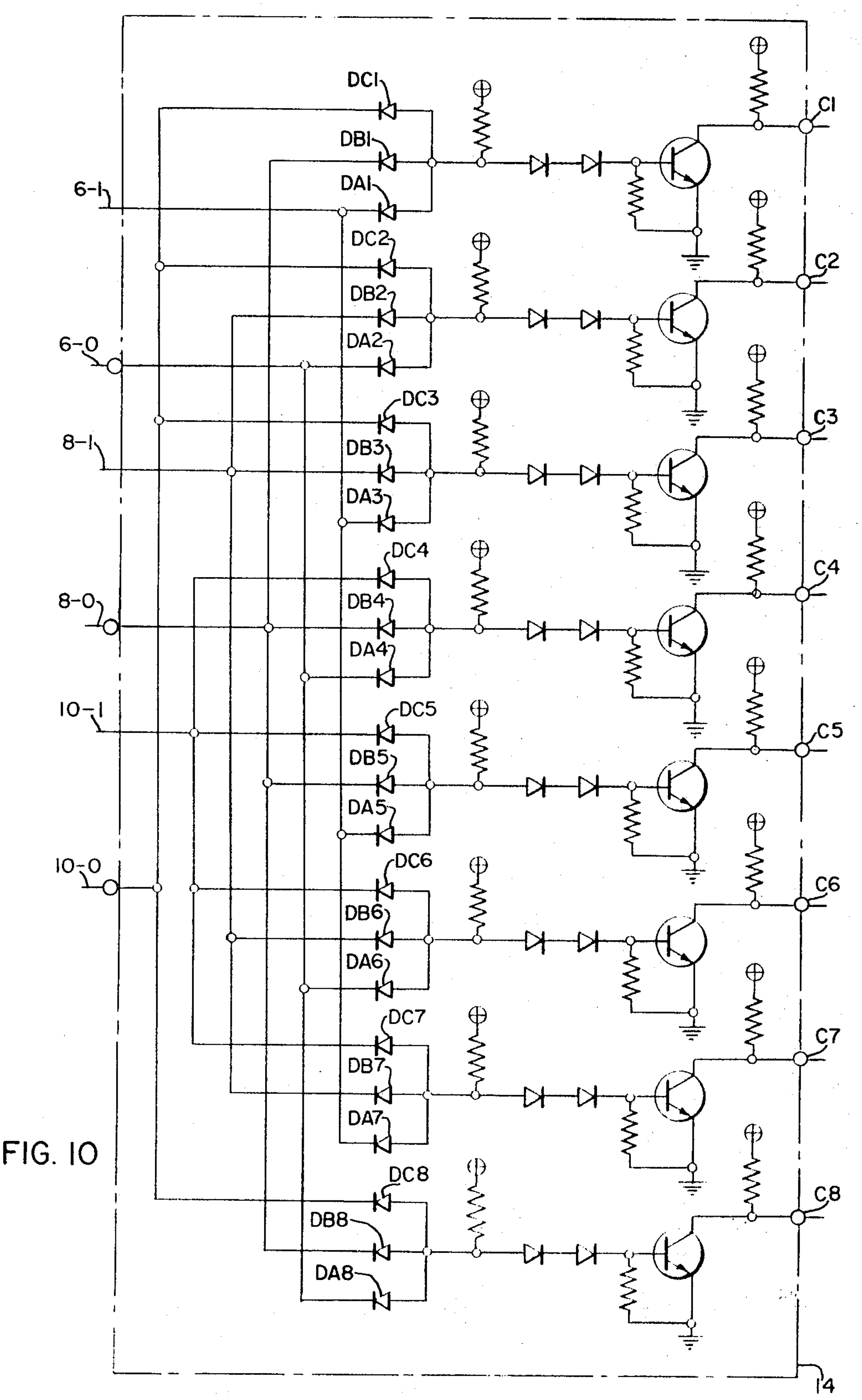

FIG. 10 illustrates schematically a circuit which may be used for the decoder and comprises essentially 8 three-input NAND devices similar to the device shown in FIG. 4 but which distinguish by being provided with an additional input circuit embodying an additional diode D4A.

As illustrated, the cathodes of the diodes DC associated with the output terminals C1, C2, C3 and C8 are each connected to the input terminal 10–0 of the decoder 14 which is connected to the 0 output terminal of the flip-flop 10. Similarly, the cathodes of the DC diodes associated with the output terminals C4, C5, C6 and C7 are all connected together to the input terminal 10–1 thereof which is in turn connected to the 1 terminal of flip-flop 10. Diodes DB associated with the output terminals C1, C4, C5 and C8 are all connected together to the input terminal 8–0 thereof which is in turn connected to the 0 terminal of the flip-flop 8. The 1 terminal of the flip-flop 8 is connected to the decoder input terminal 8–1 which is connected to the cathodes of the diodes DB associated with the output terminals C2, C3, C6 and C7. The diodes DA associated with the output terminals C1, C3, C5 and C7 are each connected to the input terminal 6–1 which is connected to the 1 terminal of the flip-flop 6. The 0 terminal of this flip-flop 6 is connected to the input terminal 6–0 to which are connected the diodes DA associated with the output terminals C2, C4, C6 and C8.

It will be appreciated from the foregoing description of the NAND device of FIG. 4, that, unless a positive potential is applied to the cathodes of all of the diodes associated in the base circuit of the transistor of a three-input terminal NAND device, the associated transistor will not conduct and the associated output terminal will be at a positive potential. If a positive potential is applied to all of the cathodes of these diodes, the associated transistor will conduct and the associated output terminal will be connected to ground to complete the desired one of the circuits through the resistors R1–R9 of FIG. 1. With the interconnection as set forth in FIG. 10, between the input terminals of the decoder 14 and the output terminals of the flip-flops 6–10 only a single one of the output terminals C1–C8 will be connected to ground at any one pulse supplied by the oscillator 1.

It is believed that the remainder of the description can best be explained by reference to the operation of the apparatus which may best be understood by a reference to the curves as shown in FIG. 2. The line marked OSC represents the output pulses from the oscillator 1 which, with certain exceptions as will be noted below, define the time periods $t_0$–$t_{90}$. The line designated CARRIER ON represents the operation of the transmission controlling switch 82 which, when closed, places a positive potential on the bus 83 to enable the clearing of the flip-flop 13. Bus 83 also places positive potential on the input terminal 84 of the NAND device 88 by standby conditions the terminal C8 is at ground potential and the inverter 90 will maintain the terminal 88 positive. Since the terminal 84 is also positive the NAND device 86 will maintain a ground potential at the C terminal of the flip-flop 13. This results in a negative or ground potential being applied to the C terminals of the flip-flops 5, 6, 8, 10 and 12. The continued application of the negative potential prevents actuation of the flip-flops by the oscillator 1. At time $t_1$, the switch 82 is opened bus 83 goes negative and a negative or ground potential pulse is applied to the input terminal S of the flip-flop 13 so that flip-flop 13 flips to increase the potential at its output terminal 1 to positive potential. This positive potential is applied to the terminals C of the flip-flops 5, 6, 8, 10 and 12 to render the countdown mechanism 4 responsive to the output pulses of the oscillator 1. The negative going portion of the oscillator pulse causes the flip-flip 6 to flip and place its output terminal 1 at a positive potential and its output terminal 0 at ground potential. This reversal of potential at the output terminals of flip-flop 6 results in the application of a positive potential to the cathodes of the diodes DA1, DA3, DA5 and DA7 and the grounding of the cathodes of the diodes DA2, DA4, DA6 and DA8. As will become apparent from the description below, in the "standby" or "at rest" condition with the switch 82 closed, the cathodes of all of the diodes DA8, DB8 and DC8 were at a positive potential whereby the associated transistor was conductive to complete the energizing circuit through resistors R8 and R9 and the conductive one of the transistors 36 and 40.

The switch 82 is opened at the time $t_1$ so that at the next negative going pulse of the oscillator, time $t_2$, the flip-flop 6 is flipped as described. This causes the cathode of the diode DA8 to become connected to ground and the associated transistor becomes non-conducting. This flipping of the flip-flop 6 also placed a positive potential on the cathode of the diode DA1 and, since at this time the cathode of each of the diodes DB1 and DC1 were already positive, the associated transistor becomes conductive to connect the output terminal C1 to ground. This is indicated by the curve C1 of FIG. 2. The curve FFA represents the operation of the flip-flop 6.

At the time $t_3$, the oscillator 1 again on its negative going portion of its pulse, flips the flip-flop 6 back to its original condition in which its output terminal 0 is positive and its output terminal 1 is grounded. The change in potential of the output terminal 1 of the flip-flop 6 from a positive to a ground potential in the rendering of the transistor associated with the output terminal C1 non-conducting and the flipping of the flip-flop 8 to place its output terminal 1 and 0 at positive and ground potentials respectively. This results in the conduction of transistor associated with output terminal C2 and the connection of the terminal C2 to ground as indicated by the curve C2. The curve FFB indicates the operations of the flip-flop 8.

In substantially the same manner, the flip-flops 6–10 will be flipped by the oscillator pulses to sequentially connect the output terminals C1–C8 to ground. The curves C1–C8 of FIG. 2 represent this operation and curves FFA, FFB and FFC represent the operation of the flip-flops 6, 8 and 10.

The curve "Data In" of FIG. 2 indicates the operation of the data-controlled transmitter 61. The raised portion of the curve indicates a positive potential at the bus 15 caused by closure of the switch 63 and the lowered portion indicates a grounded potential at the bus 15 resulting from the opening of the switch 63. The curve FFCO indicates the operation of the flip-flop 13. The lowered portion of curve FFCO indicates that the output terminal 0 is at a positive potential and the output terminal 1 is at ground potential. The raised portion of the curve indicates that the output terminal 1 is at a positive potential and the output terminal 0 is at ground potential. The curve OS/2 indicates the conductive condition of the transistor of the device 118. The curve OS indicates the conductive of the transistor of the device 102. The raised portions of the curves OS and OS/2 indicate a non-conducting condition of the transistor of the inverter 118 and of the device 102.

As indicated by the curve 48, the output wave at the output terminal 44 is a digitally simulated sine wave having a zero or neutral axis 46 which, in the present embodiment, is at a potential above ground potential and is the result of the connecting of the terminal C8 to ground. During the existence of this connection current flows from the positive input terminal 42 through the resistor R9, the conductive one of the transistors 36 and 40 and the resistor R8. The presence of the DC bias voltage is not necessary and if other circuitry were utilized might well be absent. With the terminal C8 disconnected from ground and the input terminal C1 connected to ground and with the positive half cycle transistor 36 conductive as indicated at time $t_2$ in FIG. 2, current flows through the resistors R1 and R9 to establish the first raised voltage step which occurs during the time interval $t_2$–$t_3$. At time $t_3$, the terminal C1 is disconnected from ground and the terminal C2 is connected to ground. Current then flows through the resistors R2 and R9 to establish the next step of the wave which occurs during the time interval $t_3$–$t_4$. At $t_4$ the terminal C2 is disconnected from ground and the terminal C3 is connected to ground. Current then flows through the resistors R3 and R9 to provide the raised portion of the curve 48 which occurs during the time interval $t_4$–$t_5$. At $t_5$, the terminal C3 is disconnected from ground and the terminal C4 is connected to ground. In the positive half cycle the connection of the terminal C4 to ground is without effect since this terminal is not connected to the resistor R9 through the positive half cycle transistor 36. The disconnection of the terminal C3 from ground however interrupts the circuit through the resistor R3 and permits an increase of the potential at the terminal 44 to provide the portions of the curve 48 which exists during the time interval $t_5$–$t_6$. Similarly, the output terminals C5, C6, C7 and C8 are progressively connected to ground and in trailing relation the terminals C4, C5, C6 and C7 are disconnected from ground to provide the remainder of the voltage wave 48 which exists during the time interval $t_7$–$t_{10}$.

At the time $t_9$ the output terminal 1 of the flip-flop 10 goes to ground potential and supplies a flip signal to the flip-flop 12 whereby the flip-flop reverses the potential at its output terminals 0 and 1 to make the terminal 1 positive and place the terminal 0 at ground potential. This renders the positive half cycle transistor 36 non-conducting and the negative half cycle transistor 40 conducting. Therefore during the interval $t_9$–$t_{10}$ current will transfer from the transistor 36 to the transistor 40 and will still flow through the resistors R8 and R9 to complete the corresponding portion of curve 48.

Subsequent oscillations of the oscillator 1 cause the decoder 14 to progressively connect the terminals C1–C8 to ground as indicated by the curves C1–C8 whereby current flows in sequence through the resistors R9–R4, R9–R5, R9–R6, R9–R7, R9–R6, R5–R9, R9–R4 and R9–R8, to provide the stepped wave portions of curve 48 which appear between the time intervals $t_{10}$ and $t_{18}$. At the time $t_{17}$, the flip-flop 10 again reverses and the terminal 1 thereof goes to ground potential to flip the flip-flop 12 to place it in its condition in which its terminal 0 is positive and its terminal 1 is at ground potential. This renders the transistor 36 conducting and the transistor 40 blocked to permit the formation of the wave portion appearing between the time intervals $t_{19}$ and $t_{33}$.

At the time $t_{19}$, the curve "Data In" shows a change in data requiring the wave 48 to change its frequency. With the switch 63 closed a positive potential existed at the input bus 15. This caused the input terminal 100 of the NAND device 102 to become positive and the input terminal 106 of the NAND device 108 to go to ground potential. This is without immediate effect since the terminals 114 and 116 of these devices were already at ground potential. As long as one terminal of either of these NAND devices is at ground potential thereof will be unchanged by any change in potential of the other input terminal thereof. The rendering of the terminal 106 at ground potential prevents further actuation of the device 100 and its output terminal no longer provides the negative pulses as indicated by the curve OS.

At the time $t_{20}$, the oscillator 1 provides a positive pulse to the input terminal 114 and 116. The pulse supplied to the input terminal 114 of the NAND device 102 is without effect however the positive potential pulse supplied to the input terminal 116 of the NAND device 108 causes a ground potential pulse at the input terminal T of the flip-flop 5. This causes the flip-flop 5 to reverse the polarity of its output terminals 1 and 0 so that the terminal 1 goes to ground and the terminal 0 goes positive. Due to the inverting effect of the inverter 118 the terminal T of the flip-flop 6 goes to ground potential and the flip-flop 6 flips to place its output terminal 1 at ground and make its output terminal 0 positive. This causes the decoder to ground its output terminal C2 and initiate the portion of the curve 48 at the time period $t_{20}$. At the time $t_{21}$, the oscillator 1 will again provide a positive pulse without effect on the NAND device 102 but will actuate the NAND device 108 to provide a negative or ground pulse to the input terminal T of the flip-flop 5. This causes the flip-flop 5 to flip. The terminal 0 of this flip-flop 5 goes to ground. The inverter 118 supplies a positive potential to terminal T of the flip-flop 6 without effect and provides the portion of curve 48 between the times $t_{21}$ and $t_{22}$.

At the time $t_{22}$, the oscillator 1 again provides a positive pulse without effect on device 102 but which is operable to actuate NAND device 108. When so actuated, the device 108 provides a negative going pulse to the flip-flop 5 which again flips to make its output terminal 0 positive. This positive condition of terminal 0 is reversed by the inverter and causes a negative or ground going pulse to be applied to input terminal T of the flip-flop 6. The flip-flop 6 flips to render its terminal 1 positive and its terminal 0 negative whereby the flip-flop 8 flips to render its output terminal 1 negative and its output terminal 0 positive. This flip-flop of the flip-flops 6 and 8 renders the terminal C3 at ground and initiates the portion of the curve 48 at time $t_{22}$.

It will be appreciated that the opening of the switch 63 in effect halves the frequency of the wave and is effective to provide a wave which varies in frequency with minimum of "ringing" in other transient condition at the change point in frequency.

A voltage generated at the terminal 44, as represented by the wave 48, is applied to the input terminal 50 of the buffer 52. The buffer 52 transmits an amplified signal to the filter and conditioner wherein harmonics in the signal are reduced and the almost pure sine wave is supplied for transmission at its output terminal 60.

At the time $t_{73}$, the switch 82 is closed to terminate further transmission of the intelligence carrying sine wave 8 as indicated by the rise in the wave "carrier on." This places a positive potential at the input terminals of the flip-flop 13. This is preparatory only and the transmission will not immediately terminate since at this time the NAND device 86 will be supplying a positive potential to the input terminal C. If, of course, the closure of the switch 82 occurred at a time interval in which the C8 terminal was at ground potential the terminal 88 as well as terminal 84 of the NAND device 86 would be at a positive potential and a ground potential would be applied to the input terminal C of the flip-flop 13 which would then immediately flip to provide a ground clear signal to the input terminals C of the flip-flops 5, 6, 8, 10 and 12 to terminate further generation of the wave 48.

Assuming the condition as illustrated in FIG. 2 in which the "carrier on" signal is made positive by closure of the switch 82 at a time other than at a 0° or 180° interval such as $t_{73}$, the terminal C8 will be positive whereby the signal supplied by the inverter 90 to the NAND terminal 88 will be at ground potential. Under this condition, the potential of the output signal supplied to the terminal C of the flip-flop 13 will be positive and the flip-flop 13 cannot flip to supply the clear signal to the countdown mechanism 4. At the time $t_{75}$, the terminal will be at ground potential and place the terminal 88 at a positive potential whereby the device 86 will place the terminal C of the flip-flop 13 at a negative or ground potential. The flip-flop 13 flips to supply a ground signal to the terminals C of the flip-flops 5, 6, 8, 10 and 12 whereby the wave 48 is always terminated at the value 46. The termination of the wave at the value 46 is desirable to eliminate ringing and other transients and is applicable not only to the frequency shift device hereof but to the phase shifting device of the copending application of one of the joint inventors Gyorgy Vancsa above identified.

What is claimed and is desired to be secured by United States Letters Patent is as follows:

1. A controlling network for terminating the operation of a generator having a simulated stepped sine wave output when the angle of the sine wave is 0° or 180°, a sensing circuit energized by said generator and effective to provide an output signal each time that said sine wave passes through at least one of a first and a second predetermined phase angle, said first angle being substantially at 0° and said second angle being substantially at 180° on said wave, control mechanism connected to said generator and controlling the initiation and termination of the operation of said generator, said control mechanism including an actuator having a first operating condition for rendering said control mechanism operable to initiate the operation of said generator, said actuator having a second operating condition for placing said control mechanism in a set condition, and means connecting said sensing circuit to said control mechanism for rendering said control mechanism effective to terminate the operation of said generator upon the occurrence of said output signal solely when said control mechanism is in its said set condition.

2. An apparatus for generating a variable frequency stepped simulated sine wave at a plurality of frequencies comprising, a stepped wave generator, a countdown mechanism, a pulse producing network connected to said countdown mechanism to actuate said countdown mechanism as a consequence of the production of pulses thereby, a first network connecting said countdown mechanism to said wave generator and effective when said countdown mechanism is actuated to actuate said wave generator to provide said simulated sine wave, said pulse producing network including means to determine the rate at which said pulses are supplied to said countdown mechanism, and a data-controlled network connected to said pulse network to cause its said rate determining means to change from a first to a second of said rates and thereby to cause the frequency of said sine wave to change from a first to a second of said plurality of frequencies with no substantial transient irrespective of the angle of said wave at the time of said change in said rate.

3. The combination of claim 2 in which said pulse producing network includes a pulse producing oscillator and first and second pulse supplying circuits connecting said oscillator to said countdown mechanism, one of said pulse supplying circuits including a pulse operated frequency-changing pulse generator, said rate determining means being effective to determine the one of said pulse supplying circuits which is effective to supply pulses to said countdown mechanism.

4. The combination of claim 3 in which said pulse generator is a flip-flop and in which the number of output pulses of said flip-flop have a fixed ratio with respect to the number of input pulse supplied thereto.

5. The combination of claim 4 in which said fixed ratio is one half.

6. The combination of claim 3 in which said rate determining means includes a pair of NAND devices, each said NAND device having an output terminal and a pair of input terminals, said first pulse supplying circuit including said output terminal and one of said input terminals of a first of said NAND devices, said second pulse supplying circuit including said output terminal and one of said input terminals of a second of said NAND devices, said rate determining means being connected to the other of said input terminals of both of said NAND devices.

7. Apparatus for generating a stepped sine wave at a plurality of frequencies, said apparatus comprising a pulse producing means providing a succession of time related pulses at a plurality of rates, a decoder having N number of switch means, and means actuated by said succession of pulses to sequentially render said N switch means into and out of a first state, said pulse producing means including means for selecting said rate at which said pulses are produced by said pulse producing means, and circuitry connected to said switch means for producing a plurality of voltage signals in response to a sequential rendition of said switch means into and out of their said first states, the magnitude of said signals with respect to an initial signal being in accordance with the cosine of angle X where X equals 180/N degrees, and data-controlled means for controlling said selecting means to change said rate and thereby the frequency of said sine wave solely during an interval between the occurance of two successive said pulses, whereby said wave will transfer from a first to a second of said frequencies with no substantial transient irrespective of the angle of said wave at the time of said transfer, said frequency of said sine wave being a measure of the data furnished to said data-controlled means.

8. A wave generating apparatus comprising a plurality of flip-flops, each said flip-flop including first and second output terminals and at least first and second input terminals, each said flip-flop including means responsive to a sequence of pulses applied to its said first input terminal to sequentially reverse the relative potentials of its said output terminals, each of said flip-flops further including means for placing and maintaining its said output terminals at an initial relative polarity in response to the application of a reset signal to its said second input terminal, a pair of supply terminals, a pair of output connections, positive and negative half-cycle switching devices, a plurality of voltage dropping devices, a decoder, said decoder being provided with a plurality of switching devices, circuit means interconnecting N number of said flip-flops into a cycle-repeating countdown network, circuit means connecting said countdown network to said decoder, said N flip-flops and said interconnecting circuit means being related to the number of said switching devices of said decoder so as to provide for sequentially actuating said switching devices of said decoder in an endless chain in response to the continued application of pulses to said countdown network, first and second groups of circuits interconnecting said supply terminals, said circuits of said first group of circuits each including said positive half-cycle switching device and including individually at least some of said decoder switching devices and including a first common one of said voltage dropping devices and additionally individually including devices of a first plurality of said dropping devices, said circuits of said second group of circuits each including said negative half-cycle switching device and including individually at least some of said decoder switching devices and including said first common voltage dropping device and additionally individually including devices of a second plurality of said dropping devices, a selected circuit of each of said groups including a selected one of said switching devices of said decoder, said common dropping device being so chosen with respect to said dropping device of each of said selected circuits such that the voltage established between the common connection of said common device and the said device of each said selected circuit such that the voltage between said common connection and one of said supply terminals will provide the desired base voltage of the generated wave when said selected one of said switching devices and one of said half-wave switching devices are conducting, said voltage dropping devices of each of said circuits being of such magnitude with respect to the closure sequence of the said decoder switching devices with which it is associated that the change in voltage between said common connection and said one supply terminal is proportional to the cosine of the angle of said wave at which the said switching devices is actuated, means connecting said first input terminal of an additional one of said flip-flops to said countdown device for the flipping of said additional flip-flop during the period that a selected circuit of each of said groups of circuits is energized, and interface circuitry interconnecting said output terminals of said additional flip-flop to said half-cycle switching devices for determining, at least in part, the conductive condition of said half-cycle switching devices, a carrier-on network connected to said second input terminals of said N flip-flops, and effective in a first operating condition to provide said reset signal and effective in a second operating condition to remove said reset signal a selectively actuated switch connected to said carrier-on network and effective in a first condition to maintain said carrier-on network in its said second operating condition, feedback circuitry connected to one of said circuits of said groups of circuits and effective when said first-named one circuit reaches its conducting condition following the actuation of said selectively actuated switch out of its said first condition to place said carrier-on network in its said first condition whereby said reset signal is supplied thereby to said N flip-flops.

9. The combination of claim 8 in which said feedback circuitry is connected to at least one of said selected circuits.

10. The combination of claim 9 in which said carrier-on network includes a bistable device having first and second input terminals and an output terminal, said output terminal of said bistable device being connected to said second input terminals of said N flip-flops, said selectively actuated switch being connected to said first input terminal of said bistable device and to said feedback circuit, said feedback circuit being connected to said second input terminal of said bistable device, said bistable device being characterized by the fact that when said switch is in its said second condition said bistable device will be rendered into a condition in which its said output terminal is ineffective to said reset signal to said second input terminals of said N flip-flops, said bistable device further being characterized by the fact that when switch is in its said first condition and a terminating signal is concurrently applied to its said second input terminal said reset signal will be supplied to said second input terminals of said N flip-flops.

* * * * *